Patented May 15, 1945

2,375,767

UNITED STATES PATENT OFFICE 2,375,767

DIHYDRONORDICYCLOPENTADIENYL ETHERS OF ETHER ALCOHOLS

Herman A. Bruson, Philadelphia, Pa., assignor to The Resinous Products & Chemical Company, Philadelphia, Pa., a corporation of Delaware No Drawing. Application April 1, 1944, Serial No. 529,192

11 Claims. (Cl. 260—611)

This invention relates to addition-rearrangement products of ether alcohols and dicyclopentadiene, said products being dihydronordicyclopentadienyl ethers of said ether alcohols.

It is known that ethers are obtained when dihydro-alpha-dicyclopentadiene is boiled with alcohols in the presence of selenious acid as an oxidizing agent (Alder and Stein, Liebig's Annalen der Chemie, 504, 207-209 (1933)). These known ethers are derivatives of dihydro-alpha-dicyclopentadiene-ol-3 and are formed as follows:

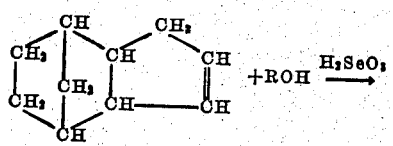

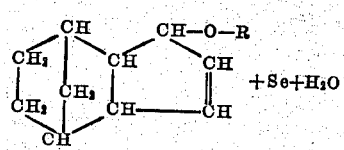

In accordance with the present invention, however, instead of the dihydro derivative, dicyclopentadiene itself is condensed in the presence of non-oxidizing acidic condensing agents, for example, sulfuric acid or boron trifluoride, as catalysts with an ether alcohol whereby addition of the hydroxyl group of the ether alcohol across the double bond of the bridged endomethylene cycle of the dicyclopentadiene occurs with a simultaneous molecular rearrangement of the latter to a hitherto unknown polycyclic ring system which, for the sake of brevity, is herein termed the "nordicyclopentadiene" ring system to distinguish it from the dicyclopentadiene ring system which is its precursor. The product obtained is a dihydronordicyclopentadienyl ether of an ether alcohol and is formed in accordance with the following equation (using beta-methoxyethanol as the typical ether alcohol), Formula A or B representing the constitution of the product, (A) being the more probable:

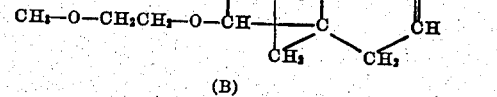

(A)

or (B)

It will be seen that the new ethers obtained according to the present invention differ from the known type in not only possessing at least two ether linkages and being formed by direct addition of the hydroxyl group to the double bond without the loss of a hydrogen atom from the dicyclopentadiene nucleus but also in being attached to a different ring of the nuclear system and in having been completely transformed into a new ring system; namely, the "dihydronordicyclopentadienyl" ring system. It will also be noted that in the dihydronordicyclopentadienyl ethers obtained according to this invention the ether oxygen atom is attached to the ring system through a —CH— group flanked on one side by a —CH₂— group and on the other side by a tertiary carbon atom, whereas in the known ethers of dihydrodicyclopentadiene-ol-3 the ether oxygen atom is attached to a —CH— group flanked by two secondary —CH— groups. This confers entirely different chemical and physical properties to the respective ethers.

In practicing this invention various ether alcohols of the aliphatic, arylaliphatic, aromatic, or cycloaliphatic series may be used, of which, for example, the glycol monoethers and the glycerol diethers as represented by the formulas,

R—O—CH₂CH₂OH

R—O—CH₂—CH—OH
          |
          CH₃

R—O—CH₂—CH—CH₂—O—R
          |
          OH wherein R is a hydrocarbon group, are the more important. To this class belong the "Cellosolves" and "Carbitols" and their homologues as, for example, glycol monoethyl ether, glycol monobutyl ether, glycol monolauryl ether, diethylene glycol monomethyl ether, diethylene glycol monobutyl ether, beta-phenoxyethanol, beta-benzyloxyethanol, glyceryl-1,3-dimethyl ether, glyceryl-1,3-diphenyl ether, propylene glycol monoethyl ether, terpinyloxyethanol, bornyloxyethanol, phenoxyethoxyethanol, and higher homologues thereof. One can also employ cyclic ether alcohols for example, tetrahydrofurfuryl alcohol.

The acidic condensing agents or catalysts which serve to promote the desired addition-rearrangement reaction according to this invention are not only sulfuric acid and boron trifluoride but also acidic derivatives thereof such as organic sulfonic acids, for example, benzene sulfonic acid or methyl sulfonic acid; acid sulfuric esters, for example, ethyl acid sulfate or methyl acid sulfate; coordination complexes of boron trifluoride with oxygenated compounds such as with ethers as typified by BF₃.O(C₂H₅)₂ and BF₃.O(C₄H₉)₂; with carboxylic acids as typified by BF₃.2CH₃COOH; with alcohols as typified by BF₃.2C₂H₅OH; with ketones as typified by BF₃.CH₃COCH₃; and with water, such as BF₃.H₂O and BF₃.2H₂O. Furthermore, the halides of amphoteric metals such as zinc chloride, stannic chloride, titanium tetrachloride, antimonic chloride, aluminum chloride or ferric chloride may be used.

It is surprising that, though boron trifluoride or sulfuric acid resinifies dicyclopentadiene in the absence of ether alcohols and also polymerizes unsaturated ethers in general, they do neither to any appreciable extent in the case of a mixture of dicyclopentadiene and the ether alcohols as described herein. On the contrary, they promote the formation of highly reactive unsaturated polyethers of the new type herein described. These new ethers are autoxidizable liquids which absorb oxygen from the air to form varnish-like films. They are also polymerizable by means of heat, light, air, oxygen and peroxides to form viscous oils which likewise dry when exposed to the air in thin films, particularly when they contain small quantities of cobalt and manganese salts as siccatives. They are thus useful in the paint and varnish industry.

In general, only a small amount of catalyst is required for the condensation, quantities of from 0.5% to 5% on the weight of the reactants being usually sufficient, but larger or smaller quantities are often effective.

The addition-rearrangement may be initiated by mixing the components and catalyst at temperatures even as low as 0° C. in some cases, or at room temperature, or at elevated temperatures. While it is generally desirable to keep the temperature low at the start, the reaction may be carried to completion or accelerated by raising the temperature or by continuing the reaction for a long time at a relatively low temperature. Temperatures as high as 100° C. to 150° C. may thus be used, the upper temperature being limited by the cracking tendency of the dicyclopentadiene to revert to monomeric cyclopentadiene. The reaction range of about 50° C. to 145° C. is generally the most useful, the best working range being 95° C. to 125° C. The reaction may be controlled by the rate of mixing the reactants and by the use of a solvent or diluent, such as a hydrocarbon solvent including petroleum ethers or petroleum naphtha, or chlorinated hydrocarbons such as carbon tetrachloride, ethylene dichloride, tetrachloroethane, and the like.

The following examples illustrate this invention, it being understood that the term "dihydronordicyclopentadienyl" refers to the new polycyclic radical C₁₀H₁₃— represented by one of the isomeric forms (A) and (B),

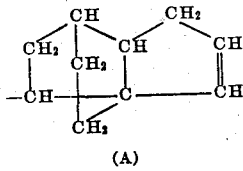

(A)

or

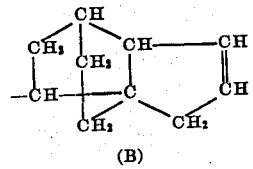

(B)

The most important polyethers obtained according to this invention possess the formula

C₁₀H₁₃—O—A—O—R wherein C₁₀H₁₃— is the dihydronordicyclopentadienyl radical, A is a divalent hydrocarbon group the chain or cycle of which may be interrupted by oxygen, and R is a hydrocarbon group or substituted hydrocarbon group.

*Example 1*

To a solution of 25 g. of 98% sulfuric acid in 180 g. of glycol monoethyl ether ("Cellosolve"), which had been prepared at 15°–20° C., there was added 132 g. of dicyclopentadiene. The resultant mixture was stirred and heated for three hours at 94°–98° C. The reaction mixture was then washed with water, yielding an oil layer which was diluted with toluene and treated with 5 g. of powdered lime. The toluene solution was then filtered and distilled under reduced pressure. The beta-ethoxyethoxydihydronordicyclopentadiene having the probable formula

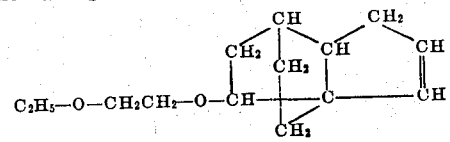

distilled at 109°–115° C./2 mm. as a colorless oil. The yield was 151 grams. Upon redistillation, it boiled at 144°–146° C./12 mm. and possessed the following constants:

$N_D^{25}$ 1.4860; $d_4^{25}$ 1.007

*Example 2*

A mixture of 182 g. of beta-phenoxyethanol, 15 g. of 98% sulfuric acid and 132 g. of dicyclopentadiene was reacted and worked up as described in Example 1.

The resulting phenoxyethoxydihydronordicyclopentadiene having the probable formula

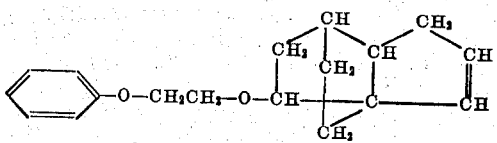

distilled at 180°–185° C./2 mm. as a pale yellow oil in a yield of 105 grams. Upon redistillation, it came over at 178°–180° C./2 mm. as a colorless oil having the following constants:

$N_D^{25}$ 1.5431; $d_4^{25}$ 1.086

Example 3

To a mixture of 118 g. of glycol monobutyl ether ("Butyl Cellosolve") and 25 g. of boron trifluoride-diethyl ether complex there was added 132 g. of dicyclopentadiene. The mixture was stirred and heated on a steam bath at 95° C. for three hours under a reflux condenser. The dark purple liquid was washed with warm water, then with soda solution, washed again with water, and dried in vacuo (30 mm.) on a steam bath. The residual oil, weighing 220 g., was distilled under reduced pressure. The butoxyethoxydihydronordicyclopentadiene

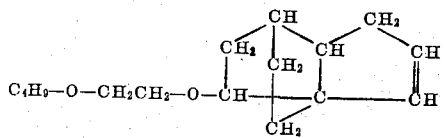

distilled at 135°–140° C./3 mm. as a colorless liquid in a yield of 177 g. Upon redistillation, it boiled at 169°–172° C./12 mm. and possessed the following constants:

$N_D^{25}$ 1.4806; $d_4^{25}$ 0.9806

Example 4

A mixture of 152 g. of benzyloxyethanol ("Benzyl Cellosolve") and 132 g. of dicyclopentadiene was heated to 55° C. and stirred while 30 g. of boron fluoride-diethyl ether complex, $BF_3.O(C_2H_5)_2$, was added dropwise during the course of ten minutes. The mixture was stirred thereafter for two hours at 60°–70° C. and finally for two hours at 95° C. It was then washed, neutralized, and dried in vacuo at 90° C. The yield was 277 g. of crude product. Upon distillation under reduced pressure the benzyloxyethoxydihydronordicyclopentadiene distilled at 188°–195° C./2 mm. as a colorless oil. The yield of purified product was 112 g. Upon redistillation it boiled at 184°–188° C./2 mm. and possessed the following constants:

$N_D^{25}$ 1.5549; $d_4^{25}$ 1.067

Example 5

A mixture consisting of 240 g. of methoxyethoxyethanol, $CH_3-O-CH_2CH_2-O-CH_2CH_2OH$, 132 g. of dicyclopentadiene, and 15 g. of 98% sulfuric acid was stirred at 95° C. for three and one-quarter hours. The product was washed with water, taken up in toluene, washed with soda solution and then with water, dried, and distilled in vacuo. The methoxyethoxyethoxydihydronordicylclopentadiene distilled at 146°–152° C./2 mm. as a colorless oil possessing the following constants:

$N_D^{25}$ 1.4905; $d_4^{25}$ 1.047

Example 6

132 g. of dicyclopentadiene was added to a solution of 25 g. of boron fluoride-diethyl ether complex, $BF_3.O(C_2H_5)_2$, and 120 g. of glyceryl-1,3-dimethyl ether. The mixture was stirred and heated at 93°–95° C. for three hours. The solution was then washed with warm water, followed by a wash with dilute soda solution and finally with water. The product was dried in vacuo at 30 mm. on a steam bath, giving a 210 g. of oily residue. Upon distillation of this oil in vacuo, a product was obtained boiling at 130°–140° C./2 mm. consisting of a colorless oil having the probable formula

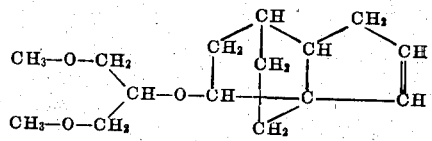

The yield was 152 g. Upon redistillation, it boiled at 162° C./12 mm. and possessed the following constants:

$N_D^{25}$ 1.4851; $d_4^{25}$ 1.036

Example 7

A catalyst solution of methyl sulfuric acid ester was prepared by dissolving 5 g. of methanol in 16 g. of 98% sulfuric acid at 10°–15° C. This solution was mixed with 153 g. of tetrahydrofurfuryl alcohol and to the mixture 132 g. of dicyclopentadiene was added. The mixture was stirred rapidly and heated at 95° C. for two and one-half hours. The product was washed thoroughly with water, and the acidity completely destroyed by means of lime. The filtered product was distilled under reduced pressure. The tetrahydrofurfuryloxydihydronordicyclopentadiene having the formula

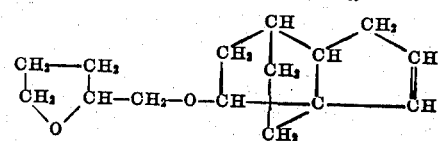

distilled over at 140°–145° C./2-3 mm. as a colorless oil in a yield of 101 g. Upon redistillation, it boiled at 139°–141° C./2 mm. and possessed the following constants:

$N_D^{25}$ 1.5042; $d_4^{25}$ 1.057

This application is a continuation-in-part of copending application Serial No. 476,640, filed February 20, 1043.

I claim:

1. An addition-rearrangement product of dicyclopentadiene and a monohydric ether alcohol, said product being a monodihydronordicyclopentadienyl ether of the ether alcohol.

2. An addition-rearrangement product of dicyclopentadiene and a glycol monoether, said product being a monohydronordicyclopentadienyl ether of the glycol monoether.

3. An addition-rearrangement product of dicyclopentadiene and ethylene glycol monoethyl ether, said product being a dihydronordicyclopentadienyl ether of the ethylene glycol monoethyl ether.

4. An addition-rearrangement product of dicyclopentadiene and ethylene glycol monobutyl ether, said product being a dihydronordicyclopentadienyl ether of the ethylene glycol monobutyl ether.

5. An addition-rearrangement product of dicyclopentadiene and ethylene glycol monophenyl ether, said product being a dihydronordicyclopentadienyl ether of the ethylene glycol monophenyl ether.

6. A method for preparing an addition-rearrangement product of dicyclopentadiene and a monohydric ether alcohol, said product being a monodihydronordicyclopentadienyl ether of the ether alcohol, which comprises reacting dicyclopentadiene with a monohydric ether alcohol in the presence of an acidic condensing agent.

7. A method for preparing an addition-rearrangement product of dicyclopentadiene and a monohydric ether alcohol, said product being a monodihydronordicyclopentadienyl ether of said ether alcohol, which comprises reacting dicyclopentadiene with a monohydric ether alcohol in the presence of a boron trifluoride catalyst.

8. A method for preparing an addition rearrangement product of dicyclopentadiene and a monohydric ether alcohol, said product being a monodihydronordicyclopentadienyl ether of said ether alcohol, which comprises reacting dicyclopentadiene with a monohydric ether alcohol in the presence of sulfuric acid as a catalyst.

9. A method for preparing an addition rearrangement product of dicyclopentadiene and the monoethyl ether of ethylene glycol, said product being a monodihydronordicyclopentadienyl ether of said glycol, which comprises reacting dicyclopentadiene with ethylene glycol monoethyl ether in the presence of an acidic condensing agent.

10. A method for preparing an addition-rearrangement product of dicyclopentadiene and the monobutyl ether of ethylene glycol, said product being a monodihydronordicyclopentadienyl ether of said glycol, which comprises reacting dicyclopentadiene with ethylene glycol monobutyl ether in the presence of an acidic condensing agent.

11. A method for preparing an addition-rearrangement product of dicyclopentadiene and the monophenyl ether of ethylene glycol, said product being a monodihydronordicyclopentadienyl ether of said glycol, which comprises reacting dicyclopentadiene with ethylene glycol monophenyl ether in the presence of an acidic condensing agent.

HERMAN A. BRUSON.